United States Patent [19]

Ford

[11] Patent Number: 4,848,734
[45] Date of Patent: Jul. 18, 1989

[54] LINE PULLER METHOD AND APPARATUS

[76] Inventor: Jack W. Ford, 714 15th Ave. West, Palmetto, Fla. 34221

[21] Appl. No.: 185,529

[22] Filed: Apr. 25, 1988

[51] Int. Cl.$^4$ ............................................. B65H 59/00
[52] U.S. Cl. ........................... 254/134.4; 254/134.3 R; 138/89; 138/91
[58] Field of Search ................... 254/134.4, 134.3 FT, 254/134.3 R, 104; 269/48.1, 234; 29/263, 280, 282; 15/104.32, 104.33, 104.061; 138/89, 91; 220/237

[56] References Cited

U.S. PATENT DOCUMENTS

| | | | |
|---|---|---|---|
| 1,075,842 | 10/1913 | McCutchen | 138/89 |
| 1,205,891 | 11/1916 | Harrison | 138/91 |
| 3,793,732 | 7/1970 | Hamrick | 254/134.4 |

FOREIGN PATENT DOCUMENTS

| | | | |
|---|---|---|---|
| 2260589 | 12/1972 | Fed. Rep. of Germany | 15/104.061 |
| 859032 | 11/1958 | United Kingdom | 15/104.061 |

Primary Examiner—Frederick R. Schmidt
Assistant Examiner—David A. Holmes
Attorney, Agent, or Firm—Dominik, Stein, Saccocio, Reese, Colitz & Van Der Wall

[57] ABSTRACT

An improved apparatus for directly pulling lines along an extended length of pipe comprising: a projectile positionable within a pipe, the projectile including a shaft having resilient plates and peripheral washers and also having an eye at its trailing end for the receipt of the line to be pulled thereby; a plug positionable within the end of the pipe adjacent the projectile, the plug having circular concentric rings extending from its exterior surface, the plug being split along a plane from its front surface to its rear surface at an angle with respect to the central axis of the plug for facilitating the placement of the plug around the line and then into the pipe, the plug having a length to diameter ratio of about 0.75:1 or greater; and means for coupling the plug to a source of compressed air which may be passed through the plug to contact and move the projectile along the length of the pipe.

6 Claims, 1 Drawing Sheet

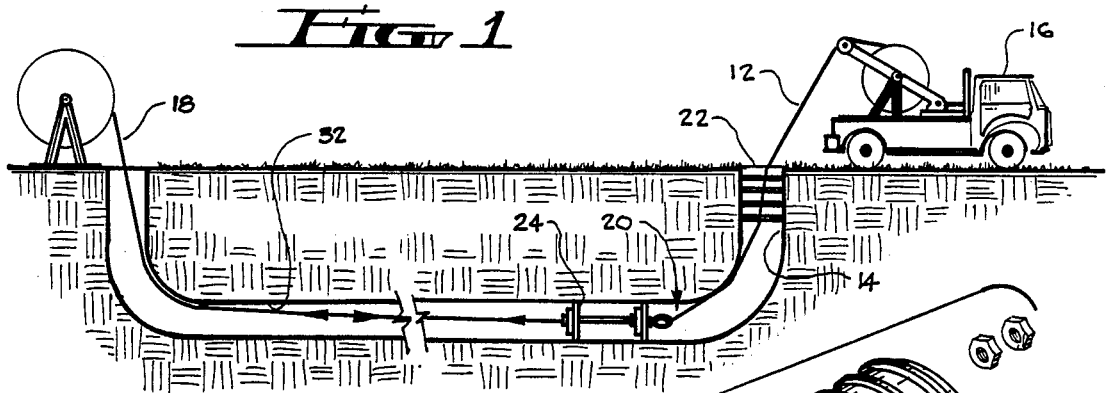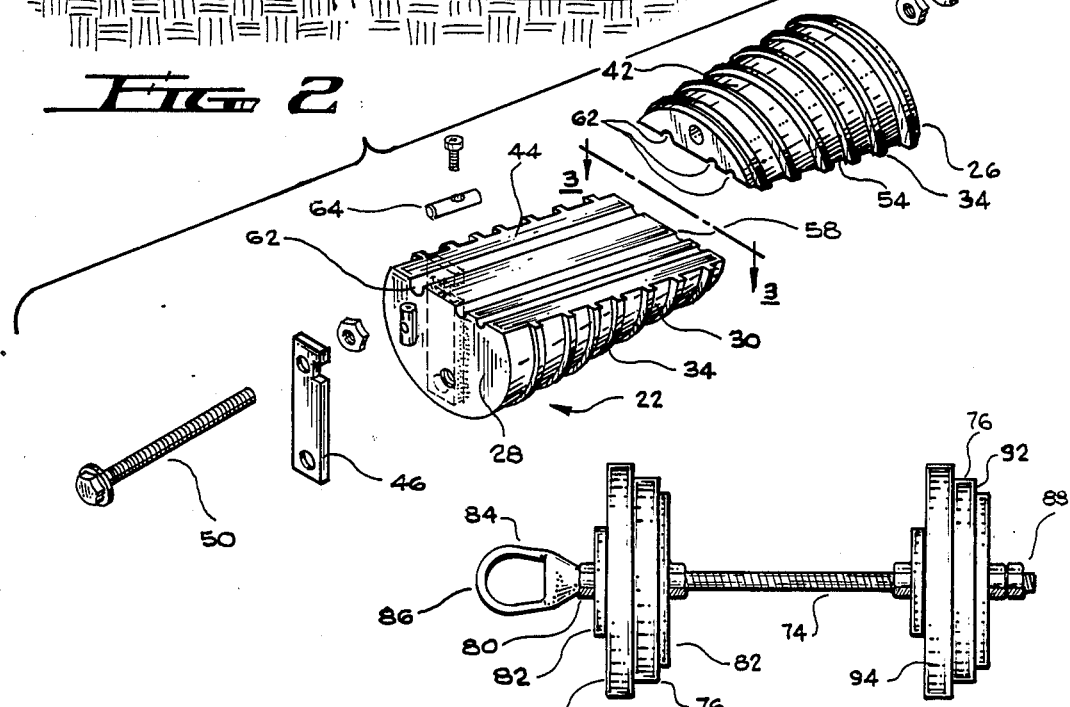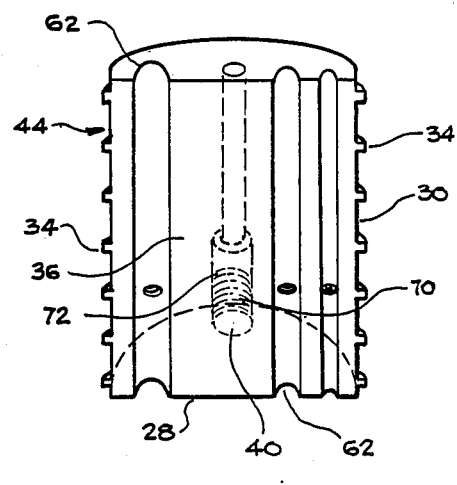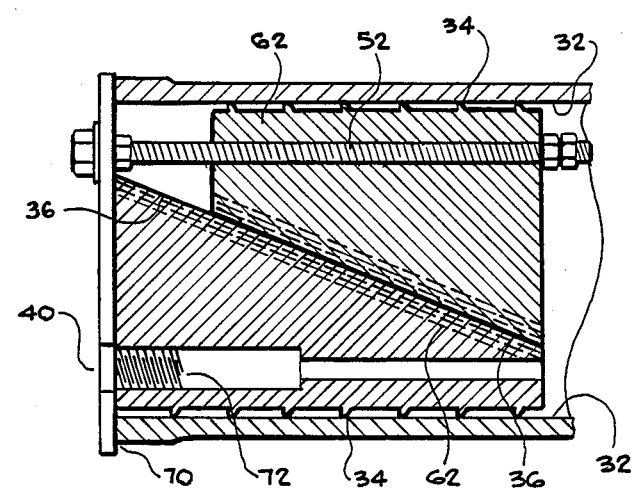

LINE PULLER METHOD AND APPARATUS

BACKGROUND OF THE INVENTION

This invention relates to line pullers and, more particularly, to a method and apparatus for directly pulling winch cable through pipes.

DESCRIPTION OF THE BRACKGROUND ART

When lines for electrical power, telephones or the like are placed underground, they are normally encased in pipe up to several miles in length. Such pipe, generally fabricated for polyvinyl-cloride (PVC) may normally be two, four, five or six inches in diameter. A problem is encountered in the original placing of the lines into the pipes or in the replacing of older or damaged lines with new lines.

Traditionally, the electric or telephone campany or other entity desiring to place lines in a pipe would insert an apertured plug into one end of the pipe. A projectile would first be placed in the pipe adjacent to the plug with a light string attached thereto and extending through an aperture of the plug. A blast of air through the plug would advance the projectile along the length of the pipe. Thereafter, the end of the string would be attached to a pull line (p-line), a heavier rope and the rope pulled through the pipe. Subsequently, the rope would pull winch cable, which in turn would pull appropriate utility lines or wires through the pipes. Such utility lines might be ligth housing wire, intermediate weight commercial wire or heavy utility lines.

Various approaches are disclosed in the patent literature to improve the efficiency of line pullers. By way of example, note U.S. Pat. Nos. 3,120,947 and 3,179,375, both to Hamrick and 4,043,537 to Russo. In those patents, the feeding of the preliminary line is effected through a blast of air. The projectile is in the form of a cylinder of a resilient material such as an elastomeric foam. The plug is formed as a tapered sealing adapter with a hole, slit or the like for the line. U.S. Pat. No. 4,726,564 to Lynn appears to be of the same type of apparatus as described in the patents noted above, but the line material is supported directly on the device which includes the tapered sealing adapter. Addition, U.S. Pat. Nos. 3,246,878 to Hamrick and 4,083,533 to Schwabe also appear to be directed to the same type of apparatus as described in the patents above, but these patents are directed to the resilient projectile per se having various configurations.

U.S. Pat. Nos. 3,034,766 to Hamrick attempts to achieve the same general objective as that defined by the patents discussed hereinabove. This patent, however, involves a gun-like element which will project the line but only over relatively short distances.

Further variations of the apparatus as described in the patents set forth above are described in U.S. Pat. No. 3,091,433 to Riley; 3,119,600 to Bitter and 3,301,531 to Corsiglia. These latter three patents achieve their motive force for their projectile via suction at the remote end of the pipe.

In addition, analogous devices for different functions are also described in the patent literature. U.S. Pat. No. 4,069,535 to Cato, for example, describes apparatus used in the oil industry for cleaning, dewatering, batching, etc. purposes with the projectile being shown in a plurality of forms. U.S. Pat. No. 4,648,744 to Knapp discloses variously shaped pigs for positioning optical fibers in buried conduit which functions somewhat analogously to the projectiles as described above but for installing fiber-optics. U.S. Pat. No. 4,715,747 to Bahrens discloses apparatus for use as a conduit prover with the equivalent of the plug being formed as an exterior sealing adapter over the exterior face of the conduit in which the line is to be placed.

Lastly, note is taken of a line plug similar to that as described herein. Such commercial device, however, is of a relatively short axial length as compared with its diameter, as in the nature of one-to-one. Such commercial devices are designed with a knurled exterior surface adapted to be received in a pipe coupler adjacent to the end of the pipe rather that in the pipe itself.

As illustrated by the great number of prior patents and commercial devices, efforts are continuously being made in an attempt to improve line puller methods and apparatus to render them more efficient, reliable, inexpensive and convenient to use particularly over increasing lengths of pipes with decreasing air power. None of these previous efforts, however, provides the benefits attendant with the present invention. Additionally, the prior patents and commertial devices do not suggest the present inventive combination of method steps and component elements arranged and configured as disclosed and claimed herein. The present invention achieves its intended purposes, objects and advantages over known methods and devices through a new, useful and unobvious combination of method steps and components elements, with the use of a minimum number of functioning parts, at a reasonable or lower cost to manufacture, and by employing only readilly available materials.

Therefore, it is an object of this invention to provide an improved apparatus for directly pulling lines along an extended length of pipe comprising: a projectile positionable within a pipe, the projectile including a shaft having resilient plates and peripheral washers and also having an eye its trailing end for the receipt of the line to be pulled thereby; a plug positionable with the end of the pipe adjacent the projectile, the plug having circular concentric rings extending from its exterior surface, the plug being split along a plane from its front surface to its rear surface at an angle with respect to the central axis of the plug for facilitating the placement of the plug around the line and then into the pipe, the plug having a length to diameter ratio of about 0.75:1 or greater; and means for coupling the plug to a source of compressed air which may be passed through the plug to conctant and move the projectile along the length of the pipe.

It is another object of this invention to feed large winch lines through conduit with increased speed and decreased power.

It is yet another object of this inventon to more fully plug ends of conduits with improved apparatus to thereby effect the efficient movement of winch lines through the conduit and yet be easily removed from the conduit and from around such winch lines.

Lastly, it is a further object of the invention to improve line puller shuttle plugs systems, plugs and projectiles, and their methods of use.

The foregoing has outlined some of the more pertinent objects of the invention. These objects should be construed to be merely illustrative of some of the more prominent features and applications of the intended invention. Many other beneficial results can be attained by applying the disclosure invention in a different manner or by modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

SUMMARY OF THE INVENTION the invention is defined by the appended claims with the specific embodiment shown in the attached drawings. For the purpose of summarizing the invention, the invention may be incorporated into improved apparatus for directly pulling lines along an extended length of pipe comprising: a projectile positionable within a pipe, the projectile including a shaft having resilient plates and peripheral washers and also having an eye at its trailing end for the receipt of the line to be pulled thereby; a plug positionable within the end of the pipe adjacent the projectile, the plug having circular concentric rings extending from its exterior surface, the plug being split along a plane from its front surface to its rear surface at an angle with respect to the central axis of the plug for facilitating the placement of the plug around the line and then into the pipe, the plug having a length to diameter ratio of about 0.75:1 or greater; and means for coupling the plug to a source of compressed air which may be passed through the plug to contact and move the projectile along the length of the pipe.

The invention may also be incorporated into an improved apparatus for use in directly pulling lines along a length of pipe by a projectile positionable within the pipe. having an improved plug positionable over the end of the pipe adjacent the projectile with the plug being formed as a cylinder with circular concentric rings extending from its exterior surface and being split along a plane from its front surface to its rear surface at an angle with respect to the central axis of the plug which also has a length to diameter ratio of about 0.75:1 or greater;. The ratio is between about 0.75:1 and about 1:1 plus or minus ten per cent. The plug further includes an aperture extending through one section for the passage of air therethrough as well as a plurality of apertures formed into the sections for the passage of lines therethrough. Further included are stoppers for closing off the unused apertures.

Further the invention may be incorporated into an improved apparatus for use in moving lines along a length of pipe with an improved projectile positionable within a pipe as the projectile includes a shaft having resilient plates and peripheral washers at opposite ends and also having an eye at the trailing end of the pipe for the receipt of the line to be pulled thereby. The plates are fabricated of rubber diaphram material and the washers are fabricated of neoprene rubber.

Lastly, the invention may be incorporated into an improved method of directly pulling lines along a length of pipe with line plug system comprising: placing a projectile with a line secured thereto inside if the pipe then inserting a cylindrical plug formed of two mating sections into the pipe with the line exteding therethrough and shifting an upper portion of the plug with respect to the lower portion to wedge the plug into the pipe finally applying air under pressure through the plug into contact with the projectile to advance the projectile and the line along the length of the pipe.

The foregoing has outlined rather broadly the more pertinent and important features of the present invention in order that the detailed description of the invention that follows may be better understood so that the present contribution to the art can be more fully appreciated. Additional features of the invention will be described hereinafter which form the sujected of the claims of the invention. It should be appreciated by those skilled in the art that the conception and the disclosed specific embodiment may be readily utilized as a basis for modifying of designing other structures for carrying out the same purposes of the present invention. It should also be realized by those skilled in the art such equivalent constructions do not depart from the spirit and scope of the invention as set forth in the appended claims.

BRIEF DESCRIPTION OF THE DRAWINGS

For a fuller understanding of the nature and objects of the invention, reference should be had to the following detailed description taken in conjunction with the accompanying drawings in which:

FIG. 1 is a perspective illustration of a site whereat winch cable is being pulled through a pipe.

FIG. 2 is an exploded perspective illustration of the plug shown in FIG. 1.

FIG. 3 is a plan view of the lower section of the plug.

FIG. 4 is a sectional view of the plug.

FIG. 5 is a sectional view of the projectile shown in FIG. 1.

Similar referenced numerals refer to similar parts throughout the several Figures.

DESCRIPTION OF THE INVENTION

With reference to FIG. 1, there is shown an underground conduit or pipe 10. It will be understood by those skilled in the art that the teachings of the subject patent application are equally applicable to a wide variety of pipes, different in terms of material, diameter, length location, function, etc. The size of the pipes for receiving underground lines normally is two, three, four, five or six inches in diameter. Their lengths may merely extend from one end of a room to the other or may extend to several miles. They may be used to encompass and protect a wide variety of lines 12, cables, wires, electrical, telephone, etc. or more modern strands such as fiber-optic cables. As such, FIG. 1 is only exemplary of the environments with which the present invention may be readily utilized. The present invention, however, is particularly suited for larger pipes. i.e., four, five or six inches in diameter.

An underground pipe 10 for the receipt of cables normally begins at a location such as a suitable manhole 14 and terminates at another but remote manhole. The pipe 10 and its cable extends between a building being serviced and a telephone exchange, source of electrical power, or the like. The lines 12, which are to be installed in the pipe 10, may be cable initially wound on a suitable drum such as on a winch truck 16 for being fed into the pipe 10. After being fed to the remote end of the pipe in accordance with the present invention, the utility line on spool 18 is attached to the cable 12. The cable is then wound by the winch truck to pull the utility line through the pipe 10. It should be appreciated that the underground pipe, shown in FIG. 1, has been shown enlarged with respect to the other objects for purposes of illustration only.

With respect to FIGS. 2, 3 and 4, a suitable line pulling system 20, including a plug 22 and projectile 24, is shown for effecting the movement of the line through the conduit. The disclosed plug and projectile are illustrative of the preferred or primary embodiment of the instant invention.

As most clearly seen in FIG. 2, the plug is formed as a member of a length extending between a front planar surface 26 and a rear planar surface 28 with a surface 30 therebetween shaped as right circular cylinder. The exterior diameter of the plug 22 is essentially equal to the interior diameter 32 of the pipe 10 in which it is to be received. Concentric rings 34 extend from surface 30. The diameter of the plug could be any dimension, but preferably is fabricated as four, five or six inches to correspond with the diameter or most commercially available pipes today. The axial length of the plug is about 3¾ to 4 inches for a 4 or 5 inch pipe, or about 5 inches or a 6 inch pipe. A variation of about plus or minus ten percent has been found acceptable. Longer plug lengths will work but simply represent an additional cost and unnecessary weight for the efficient operation of such plugs. As such, a ratio of axial length to diameter of between 0.75:1 and 1:1 has been found to be the preferred range with the minimum length being about 0.75:1 plus or minus the percent.

Extending such plugs into the interior diameter of the pipe rather than into a short coupling element, results in increased surface area for greater operating efficiency of the plugs.

In order to effect the appropriate fitting of a plug into the interior of a pipe, the plug is split along a flat plane 36 extending from the front surface 26 to the rear surface 28, angularly offset from the central axis 40 of the plug at about twenty degrees plus or minus ten percent and preferably extending through the central axis. This forms an upper section 42 and a lower section 44. In this manner the lower section 44 of the plug may be first inserted to an appropriate essentially full depth within the end of the pipe 10. An end plate 16 is secured to the one section 44 by welding and to the other section by a securement bolt 50 which limits the depth of entry of the plug 22 into the pipe 10. Thereafter the upper section 42 may be advanced until its upper cylindrical surface contacts the interior lower surface of the pipe. The movement of the upper section with its lower surface 54 sliding along the upper surface 58 of the lower section effects a cam-like action which effects the intended contact and coupling between the plug and the pipe. It also effects a slight deformation of the pipe due to contact by concentric circular ridges in the plug. Note FIG. 4. The bolt 50 extending through a threaded aperture in the upper section 42 is provided with threads to facilitate the movement of the sections with respect to each other for effecting the fitting of the plug segments into final meeting contact in the pipe as well as facilitating its removal.

The length of the plug is the length of the lower or longer section. The upper or shorter section has a cut out adjacent to its rear end to acccommodate the motion imparting elements. Such upper or shorter section is of a length greater than half the length of the lower or longer section.

Formed in adjacent faces of the segments are a plurality of apertures 62, three in the preferred embodiment, extending between the rear face and the front face. The apertures are of varying diameters to correspond to the diameters of winch lines 12 to be fed therethrought and through the pipe. Small cylindrical stoppers 64 may be fitted into the unused apertures, and secured to the plug by Allen's head screws 66 to minimize back pressure from leaking from the conduit between the plug and projectile during operation and use. The plug being split in two sections. allows for placement and removal of lines with respect to the plug.

A central orifice 70 extends through the plug whereby air under pressure may introduced into the pipe between the plug and the projectile during the line pulling action. A threaded pipe nipple 72 with ½ inch pipe threads extends into the rear face of the plug to effect coupling with the source of pressure.

Used in association with the line puller is a projectile 24 adapted to be secured to the leading edge of the line to be pulled. The projectile is formed of a central shaft 74 threaded along front and back portions of its length adjacent to its opposite ends for receipt of a plurality of cylindrical plates 76, front and back. The cylindrical plates function as pistons and, when coupled to the shaft by bolts 78 and washers 80 constitute a bar-bell shaped device. An eye 54 on the trailing end 86 of the projectile, but not on its leading end 88, allows for coupling with the leading edge of the line for movement along the length of the pipe.

The diameter of each plate is adapted to be only slightly larger than the interior diameter of the conduit in which it moves. The plates are formed of a plurality of diaphragm rubber backing disks 92, each with a sealing washer 94. The diaphragm material may be a suitably rigid material for minimum deflection during operation and use. Rubber diaphragm material has been found suitable. A suitable material for the washers in neopreme rubber. The peripheries of the plates will thereby deform slightly to correspond to the interior diameter of the conduit. As such, air under pressure untroduced through the plug will project the projectile along the entire length of the conduit.

It has been found that a one-hundred cubic feet per minute (cfm), which is a commonly used compressor in the telephone and electric industry, at about fifty to sixty pounds per square inch (psi) can project the projectile and attached winch line along the length of pipes for 1,500 feet to 2,000 feet eliminating the need for lighter strings and pull ropes (p-lines) being first pulled along the length of the conduit and then used to pull the heavier winch lines therethrough.

In testing by an independent consulting engineer, the shuttle plug was inserted into the end of a four (4) inch pipe and connected to a pneumatic supply. The test was an attempt to verify the ability of the plug to withstand the operational forces without blowing out. In the initial testing, the plug was inserted, tightened and a maximum flow of ninety (90) psi air was inserted in the test vehicle. A standard pressure gauge was used to verify the pressure. The initial test was performed by using a seventy (70) cubic inch, three-thousand (3,000) psi air tank. It was opened into the test fixture using the same standard pressure gauge, maximum pressure of sixty (60) psi was achieved. The flow rate from the tank, because of the orifice in the valve, was insufficient to achieve higher pressures because of the leak rate. This test was inconclusive based on the fact that the fifty (50) psi exerted a nominal force of six-hundred (600) pounds to force the plug out of the test fixture. The plug remained secure: it did not move.

Test number two was performed by applying ninety (90) pounds grease to the inside of the four (4) inch diameter pipe. Because of the modified configuration of the plug, there was no change in the operation of the system. The plug remained secured.

Under the next test, the same condition applied except the torque was measured and applied to the tightening bolt. Torque applied was ten (10) inches-pounds. Upon repeating of the test, the maximum pressure that could be achieved was forty-five (45) psi. The plug moved slightly and tightened up. The wedging action caused the plug to become self-tightening. The test was performed again and the bolt was tightened to a one-hundred (100) inches-pounds. There was no movement of the plug as a result of the ensuing test at approximately forty (40) psi.

the next test consisted of a fracture test. The plug was inserted into the end of a Schedule forty (40) PVC pipe. The bolt was tightened to three-hundred ten (310) inches-pounds of torque. There was no fracture of the pipe under those conditions and after three (3) cycles there was no sign of any permanent deformation.

This device will not fracture or split the pipe even under adverse conditions. However, the torque should be specified for users. To secure the device properly, the user should tighten to a maximum torque of one-hundred twenty (120) inches-pounds then stop for thirty (30) seconds and tighten again to one-hundred fifty (150) inches-pounds maximum.

The plug was secured in a piece of PVC Schedule forty (40) pipe with the opposite end glued into a four (4) inch PVC "T" and braced. A threaded pipe was inserted into the blowhole and a hydraulic jack was applied to attempt to pull the plug from the PVC, the PVC "T" connection fractured before the plug was extracted. The PVC fractured at a pulling force of approximately sixteen-hundred (1,600) pounds.

It was found that because of the elasticity of the PVC, that torque readings vary considerably depending upon the condition of the internal wedge surface.

The plug is suitable for the task for which it is intended. It appears to be inherently safe from operator injuries with the following precautions: 1. Be sure that the inlet to the conduit is free of grease. 2. Install plug and tighten bolt to one-hundred fifty (150) inches-pounds. 3. Do not stand in front of the plug when system is in operation.

The present disclosure includes that contained in the appended claims as well as that of the foregoing decription. Although this invention has been described in its preferred forms with a certain degree of particularity, it is understood that the present disclosure of the preferred form has been made only by way of example and numerous changes in the details of construction and combination and arrangement of parts may be resorted to without departing from the spirit and scope of the invention. For example, although the present invention is primarily contemplated for use in pulling winch cables of varing sizes, it could readily be used for pulling lines of other types including pull ropes (p-lines), strings, etc.

Now that the invention has been described,
What is claimed is:

1. Apparatus for directly pulling winch cable along an extended length of pipe comprising:

a projectile positionable within a pipe, the projectile including a shaft having resilient plates and peripheral washers and also having an eye at its trailing end for the receipt of the winch cable to be pulled thereby;

a generally cylindrical plug removably positionable within the end of the pipe adjacent the projectile, the plug having circular concentric rings extending from its exterior surface adapted to imbed into the inner surface of the pipe for forming a high pressure seal, the plug being split along a plane from its front surface to its rear surface at an angle with respect to the central axis of the plug to form two mating plug sections and having adjusting means adapted to urge the exterior surface of one plug section with respect to the other for size adjustment purposes, the plane being formed with a recess for receiving a winch cable between the plug sections for facilitating the placement of the plug around the winch cable and then into the pipe, the plug having a length to diameter radio about 0.75:1 or greater; and a separate aperture extending through one of the plug sections with means formed in the plug for coupling the aperture to a source of compressed air which may be passed through the aperture to contact the move the projectile along the length of the pipe.

2. For use in directly pulling winch cable along a length or pipe by a projectile positionable within, and movable through, the pipe, an improved plug removably positionable within the end of the pipe adjacent the projectile, the plug being formed as a cylinder with circular concentric rings extending from its exterior surface adapted to imbed into the inner surface of the pipe for forming a high pressure seal, the plug being split along a plane from its front surface to its rear surface at an angle with respect to the central axis of the plug to form two sections and having adjusting means adapted to urge the exterior surface of one plug section with respect to the other for size adjustment purposes, the plane being formed with a recess for receiving a winch cable between the plug sections for facilitating the receipt of the winch cable therebetween, and a separate aperture extending through one of the plug sections for coupling the aperture to a source of compressed air to be passed through the aperture, the plug also having a length to diameter ratio about 0.75:1 or greater.

3. The plug as set forth in claim 2 wherein the ratio is between about 0.75:1 and 1:1 plus or minus ten per cent.

4. The plug as set forth in claim 2 and further including an aperture extending through one section for the passage of an air therethrough.

5. The plug as set forth in claim 4 and further including a plurality of apertures formed into the sections for the passage of winch cable therethrough.

6. The plug as set forth in claim 5 and further including stoppers for closing off the unused apertures.

* * * * *